(12) United States Patent
Maehara et al.

(10) Patent No.: US 7,913,662 B2
(45) Date of Patent: Mar. 29, 2011

(54) ENGINE WITH CYLINDER DISABLING MECHANISM

(75) Inventors: Hayato Maehara, Saitama (JP); Toshiyuki Sato, Saitama (JP); Takaaki Tsukui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 387 days.

(21) Appl. No.: 12/200,255

(22) Filed: Aug. 28, 2008

(65) Prior Publication Data

US 2009/0056669 A1  Mar. 5, 2009

(30) Foreign Application Priority Data

Aug. 31, 2007  (JP) ................... 2007-224989

(51) Int. Cl.
*F02D 13/06* (2006.01)
(52) U.S. Cl. .................. 123/198 F; 123/196 R
(58) Field of Classification Search ............ 123/198 F, 123/196 R
See application file for complete search history.

(56) References Cited

U.S. PATENT DOCUMENTS 3,142,358 A * 7/1964 Woerheide, Jr. ............... 184/6.4

FOREIGN PATENT DOCUMENTS

JP  2000-204917 A  7/2000

* cited by examiner

*Primary Examiner* — Noah Kamen
(74) *Attorney, Agent, or Firm* — Birch, Stewart, Kolasch & Birch, LLP

(57) ABSTRACT

An engine includes engine valves disposed on intake and exhaust sides of a combustion chambers with a valve operating device for opening and closing the engine valves and an engine valve disabling mechanism for disabling opening and closing movement of the engine valves in response to hydraulic pressure. An oil pump is disposed in a lower portion of the crankcase, for supplying hydraulic pressure to the engine valve disabling mechanism. A hydraulic pressure control valve controls the supply of hydraulic pressure to the engine valve disabling mechanism depending on a vehicle operating state. An oil passage extends to the hydraulic pressure control valve and can easily be formed without affecting mounts for functional components. A pipe for delivering working oil from the lower portion of the crankcase to the hydraulic pressure control valve is disposed on a front surface of the engine.

20 Claims, 10 Drawing Sheets

ENGINE WITH CYLINDER DISABLING MECHANISM

CROSS-REFERENCE TO RELATED APPLICATIONS

The present application claims priority under 35 USC 119 to Japanese Patent Application No. 2007-224989 filed on Aug. 31, 2007 the entire contents of which are hereby incorporated by reference.

BACKGROUND OF THE INVENTION

1. Field of the Invention

The present invention relates to an engine with a cylinder disabling mechanism, and more particularly to a hydraulic pressure supply oil passage for supplying hydraulic pressure to hydraulic pressure control valves for controlling the supply of the hydraulic pressure to the cylinder disabling mechanism.

2. Description of Background Art

Engines are known wherein the engines have a valve disabling mechanism associated with engine valves. According to the valve disabling mechanism, oil is delivered from an oil pump disposed in a lower portion of the engine to hydraulic pressure control valves, which controls hydraulic pressure delivered to the valve disabling mechanism to disable cylinders depending on a vehicle operating state. The oil is supplied from the oil pump to the hydraulic pressure control valves through oil passages defined in a crankcase and a cylinder block. See, for example, Japanese Patent Laid-Open No. 2000-204917.

Heretofore, it has been difficult to define the oil passages in the crankcase and the cylinder block. More particularly, since functional components such as a starter motor, etc., are mounted on a rear surface of the engine, design considerations have been required to form the oil passages in bypassing relation to attachment areas for the functional components.

SUMMARY AND OBJECTS OF THE INVENTION

An embodiment of the present invention proposes a hydraulic pressure supply oil passage for supplying hydraulic pressure to hydraulic pressure control valves, which can simply be formed without affecting attachment areas of a rear surface of an engine for functional components.

According to an embodiment of the present invention, an engine is provided with a cylinder disabling mechanism that includes a crankcase of a motorcycle engine with a cylinder block mounted on an upper portion of the crankcase and having a plurality of cylinders with pistons disposed respectively therein. A cylinder head is mounted to an upper portion of the cylinder block with a cylinder head cover being mounted to an upper portion of the cylinder head. Combustion chambers are defined between a lower surface of the cylinder head and upper surfaces of the pistons. Engine valves are disposed in the cylinder head on intake and exhaust sides of the combustion chambers with a valve operating device disposed between the cylinder head and the cylinder head cover, for opening and closing the engine valves. An engine valve disabling mechanism is provided for disabling opening and closing movement of the engine valves in response to hydraulic pressure. An oil pump is disposed in a lower portion of the crankcase, for supplying the hydraulic pressure to the engine valve disabling mechanism. A hydraulic pressure control valve is provided for controlling the supply of hydraulic pressure to the engine valve disabling mechanism depending on a vehicle operating state. A pipe is provided for delivering working oil from the lower portion of the crankcase to the hydraulic pressure control valve. The pipe is disposed on a front surface of the engine.

According to an embodiment of the present invention, the cylinder disabling mechanism is associated with the cylinders. The hydraulic pressure control valve includes a plurality of hydraulic pressure control valves corresponding to the cylinders associated with the cylinder disabling mechanism. The pipe is disposed on the front surface of the engine and includes an upper portion connected to a working oil supply passage defined in an upper portion of the cylinder head cover. The working oil supply passage extends to a region intermediate between adjacent ones of the hydraulic pressure control valves and is branched and connected to inlet ports of the respective hydraulic pressure control valves.

According to an embodiment of the present invention, since the oil passage to the hydraulic pressure control valve includes an externally mounted pipe, the oil passage can be installed more easily than if it is defined in the crankcase and the cylinder block as is the case with the background art.

If the oil passage is disposed on a rear surface of the engine, the pipe is complex and long because of functional components including an intake system, a starter motor, a knock sensor, a coolant hose, etc. The oil passage disposed on the front surface of the engine allows the pipe to be short and easily installed.

According to an embodiment of the present invention, the working oil supply passage defined in the upper portion of the cylinder head cover extends to the region intermediate between adjacent ones of the hydraulic pressure control valves and is branched and connected to the inlet ports of the respective hydraulic pressure control valves. Therefore, the working oil supply passage in the upper portion of the cylinder head cover is short.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
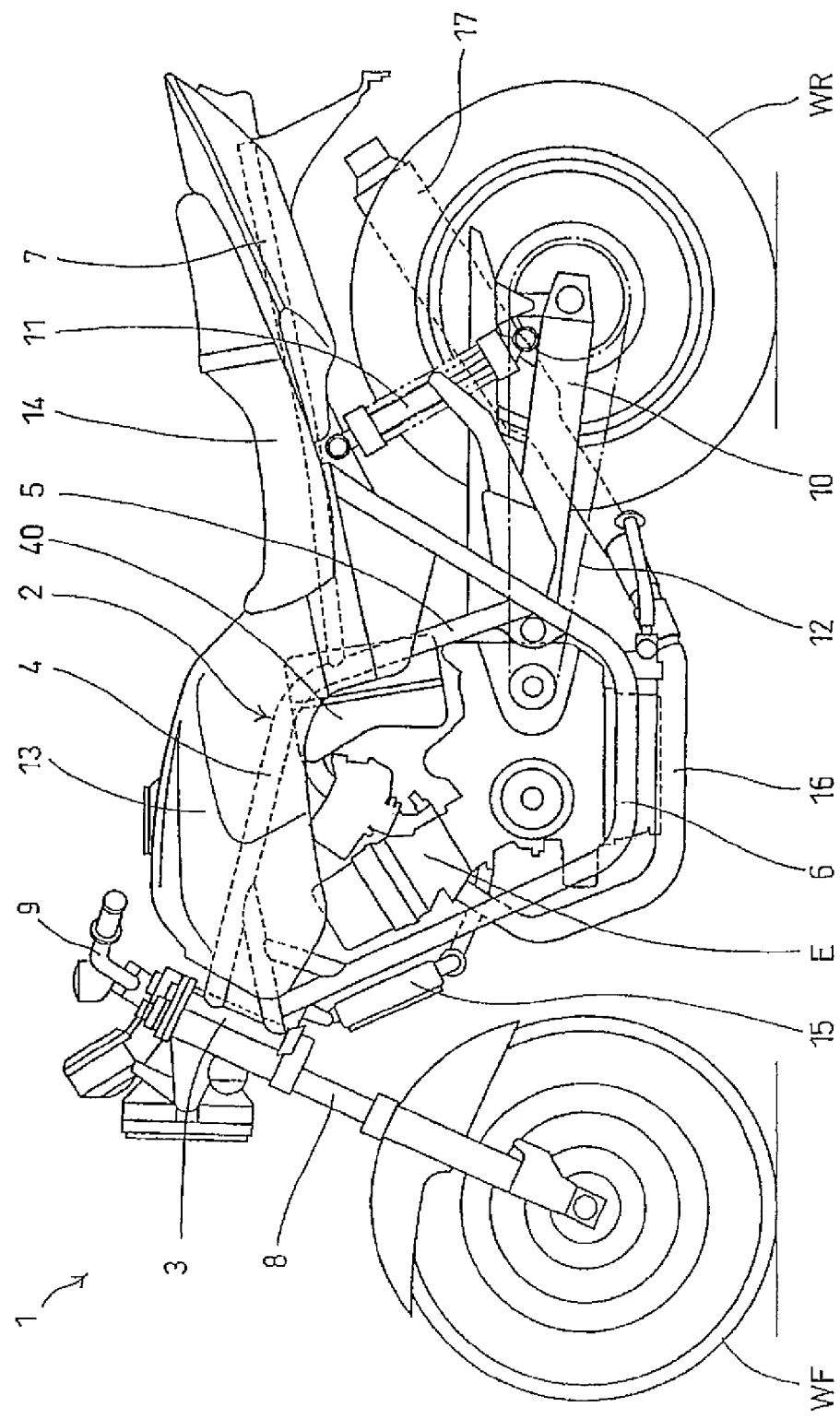
FIG. 1 is a side elevational view of a motorcycle 1 according to an embodiment of the present invention.

FIG. 1 is a side elevational view of a motorcycle 1 according to an embodiment of the present invention. In FIG. 1, the motorcycle 1 includes a body frame 2 including a head pipe 3, main frames 4, 4 extending obliquely rearwardly from the head pipe 3, central frames 5, 5 extending downwardly from the rear ends of the main frames 4, 4, down pipes 6, 6, and a seat stay 7 extending rearwardly from the main frames 4, 4 and the down pipes 6, 6. A front wheel WF is supported by a front fork 8 which is steerably supported by the head pipe 3. A steering handle 9 is mounted to an upper portion of the front fork 8. A rear wheel WR is supported by a rear fork 10 that is vertically swingably supported by a rear portion of one of the central frames 5. A shock absorber 11 is disposed between the seat stay 7 and the rear fork 10. An engine E is supported by the main frames 4, 4 and the central frames 5, 5. Power from the engine E is transmitted to the rear wheel WR through a transmission combined with the engine E and a rear wheel drive chain 12. A fuel tank 13 that is positioned above the engine E is mounted on the main frames 4, 4 and the central frames 5, 5. A tandem seat 14 for the driver and passenger to be seated thereon is mounted on the seat stay 7. A radiator 15 is disposed in front of the engine E. An exhaust pipe 16 which extends from a front surface of the engine E extends below the engine E and is connected to a muffler 17 disposed in a rear portion of the body frame 2.

Figure 2:
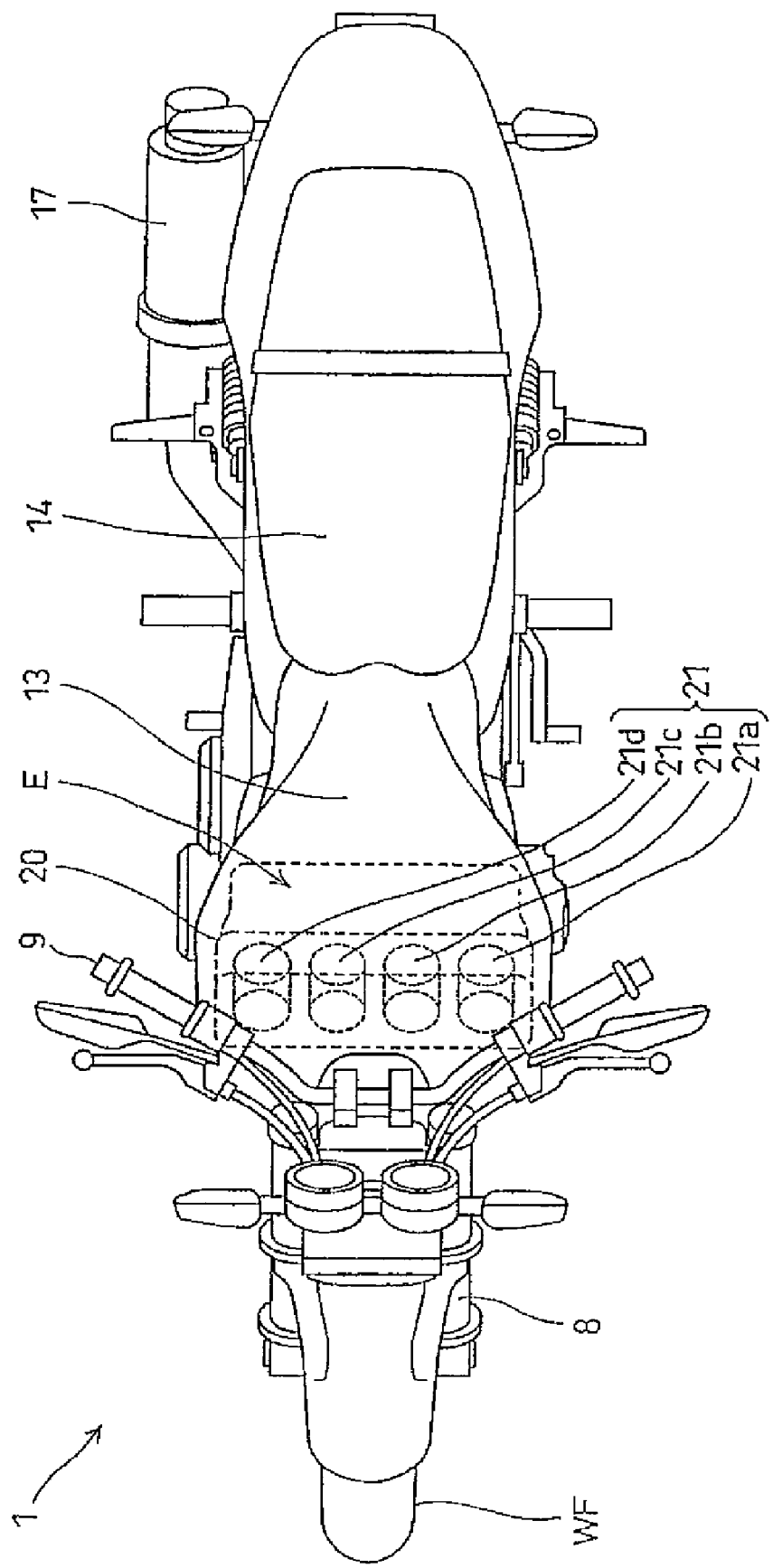
FIG. 2 is a plan view of the motorcycle 1.

FIG. 2 is a plan view of the motorcycle 1. In FIG. 2, the engine E includes a four-cylinder engine including a cylinder block 20 with four cylinders 21 (21a, 21b, 21c, 21d) defined therein which are arrayed in a lateral direction.

Figure 3:
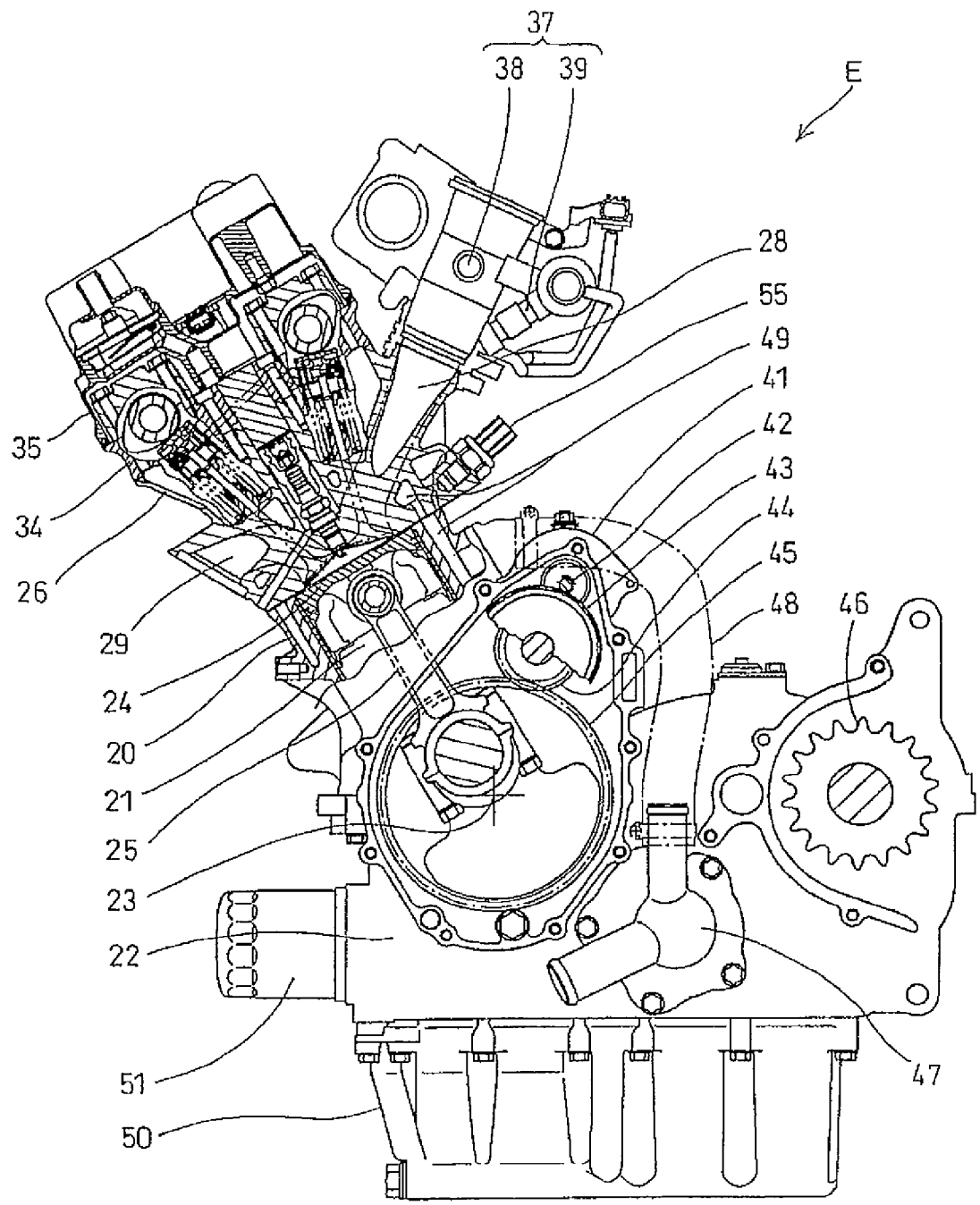
FIG. 3 is a vertical cross-sectional view of an engine including ignition plugs.

FIG. 3 is a vertical cross-sectional view of the engine E including ignition plugs according to the above embodiment. The engine E is a four-cylinder engine, and the cylinders 21 defined in the cylinder block 20 are inclined forwardly in the direction in which the motorcycle 10 is propelled. As shown in FIG. 2, the four cylinders 21 are arrayed widthwise across the motorcycle 10. A crankcase 22 houses a crankshaft 23 extending widthwise across the motorcycle 10. Pistons 24 are slidably fitted in the respective cylinders 21 and connected to the crankshaft 23 by connecting rods 25.

Figure 4:
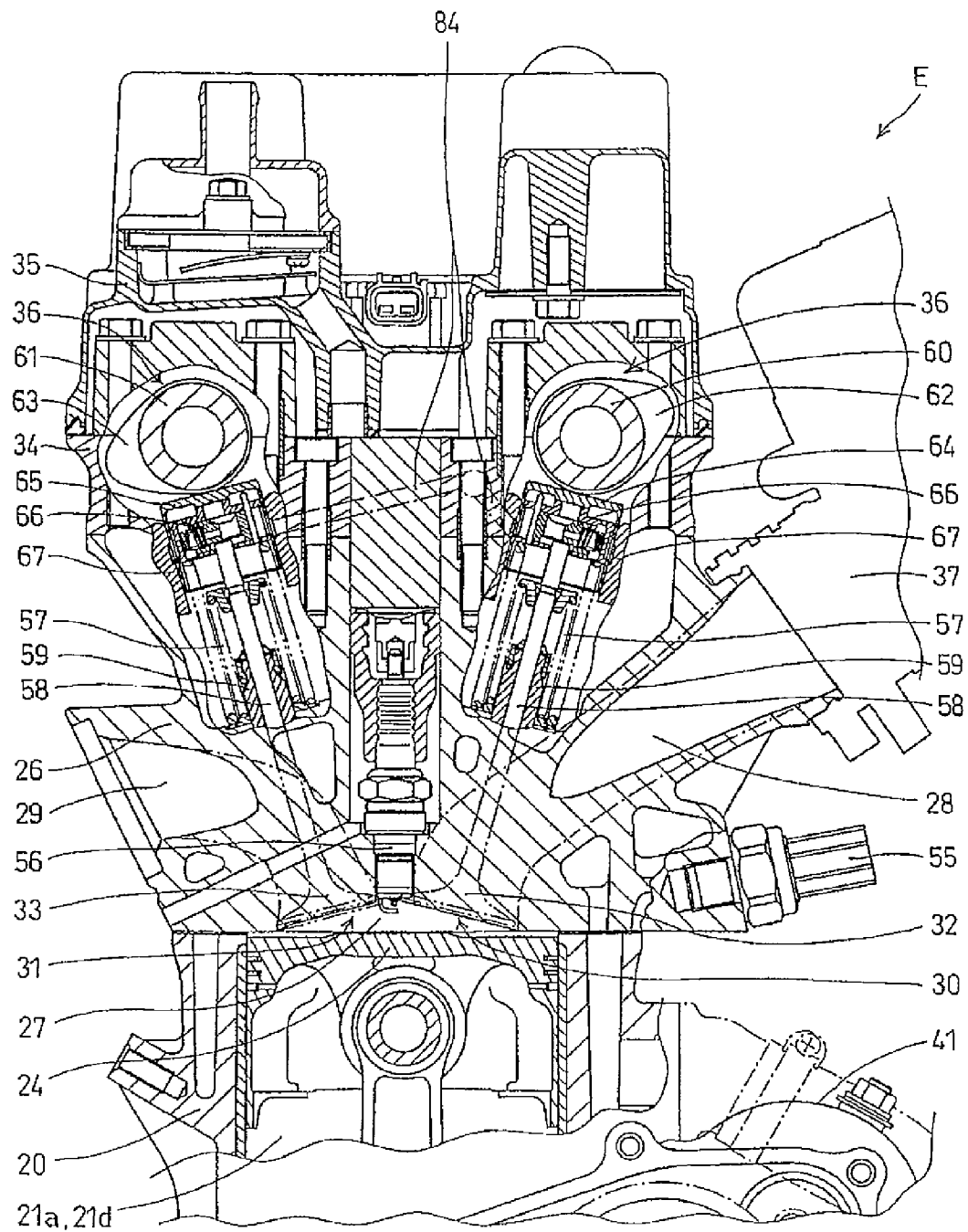
FIG. 4 is an enlarged view of a portion of FIG. 3.

FIG. 4 is an enlarged view of a portion of FIG. 3. In FIG. 4, a cylinder head 26 is mounted to an upper portion of the cylinder block 20 and has recesses defined in a lower surface thereof in alignment with the cylinders 21, providing combustion chambers 27 between themselves and the upper ends of the pistons 24. The cylinder head 26 has intake ports 28 and exhaust ports 29 which communicate with the combustion chambers 27. Each of the intake ports 28 is connected to the combustion chamber 27 through a pair of intake openings 30, and each of the exhaust ports 29 is connected to the combustion chamber 27 through a pair of exhaust openings 31. The intake openings 30 and the exhaust openings 31 can be opened and closed by intake valves 32 and exhaust valves 33 disposed respectively therein. A cylinder head cover 35 is mounted to an upper portion of the cylinder head 26 with a cylinder head extension member 34 interposed therebetween. A valve operating device 36 is disposed between the cylinder head extension member 34 and the cylinder head cover 35. An intake system 37 is connected to the intake ports 28.

In FIG. 3, the intake system 37 mainly includes a throttle valve 38 and a fuel injector 39. An air cleaner 40 shown in FIG. 1 is connected to a rear portion of the throttle valve 38. A starter motor 41 is disposed on an upper surface of the crankcase 22 behind the cylinder block 20. For starting the engine E, drive power from the starter motor 41 is transmitted through a pinion 42 mounted on the rotational shaft of the starter motor 41, a first idle gear 43, and a second idle gear 44 to a large-diameter driven gear 45 mounted on the crankshaft 23, thereby rotating the crankshaft 23. The crankcase 22 houses therein a full-time-mesh gear transmission (not shown) including a main shaft and a countershaft. The countershaft has a shaft end portion projecting out of the crankcase 22 and supporting a sprocket 46 mounted thereon. The rear wheel drive chain 12 shown in FIG. 1 is held in mesh with the sprocket 46. A water pump 47 which is driven by the main shaft through a chain is mounted on a side surface of the crankcase 22. The water pump 47 supplies a coolant through a water hose 48 to a water jacket 49 defined in the cylinder block 20 and the cylinder head 26 to cool the engine E. After having cooled the water jacket 49 the water is cooled by the radiator 15 shown in FIG. 1 and retrieved for circulation. An oil pan 50 is mounted on a lower portion of the crankcase 22, and an oil filter 51 is mounted on a front portion of the crankcase 22. A knock sensor 55 is positioned between the intake system 37 and the cylinder block 20.

In FIG. 4, an ignition plug 56 is disposed centrally in each of the combustion chambers 27 and surrounded by a pair of intake valves 32 and a pair of exhaust valves 33. The four cylinders 21 include two cylinders 21a, 21d on the left and right ends of the cylinder array. Each of the cylinders 21a, 21d is associated with an intake valve lifter 64 and an exhaust valve lifter 65 each combined with a valve disabling mechanism 66. FIG. 4 shows a cross section of the cylinder 21a or 21d combined with the valve disabling mechanism 66. The intake valves 32 and the exhaust valves 33 are normally urged to be closed by valve springs 57 disposed in the cylinder head 26. These valves are operated by the valve operating device 36 to open and close the intake openings 30 and the exhaust openings 31, respectively. The intake valves 32 and the exhaust valves 33 are reciprocally movable along the directions in which they are opened and closed because they have valve stems 58 slidably fitted in tubular valve guides 59 fixedly mounted in the cylinder head 26.

The valve operating device 36, which is disposed between the cylinder head 26 and the cylinder head cover 35, opens and closes the intake valves 32 and the exhaust valves 33 at given timings depending on the angular position of the crankshaft 23. The valve operating device 36 includes an intake cam shaft 60, an exhaust cam shaft 61, intake cams 62, exhaust cams 63, intake valve lifters 64, exhaust valve lifters 65, and the valve disabling mechanisms 66 for disabling the intake valves 32 and the exhaust valves 33. The valve disabling mechanisms 66 are disposed in the respective valve lifters 64, 65 of the intake valves 32 and the exhaust valves 33 in the cylinders 21a, 21d on the left and right ends of the cylinder array. The valve lifters 64, 65 are fitted in respective lifter supports 67 disposed in the cylinder head extension member 34 and supported for sliding movement in the directions along the valve stems 58.

Since the valve disabling mechanism 66 for the intake valve 32 and the valve disabling mechanism 66 for the exhaust valve 33 are identical in structure to each other, the valve disabling mechanism 66 for the intake valve 32 will be described below. The valve disabling mechanism 66 is a mechanism for selectively transmitting the valve drive power which has been transmitted from the intake cam 62 to the valve lifter 64, to the intake valve 32. The valve disabling mechanism 66 is controlled by the working oil of a hydraulic pressure control system. When the engine E operates at a low speed or under a low load, the valve disabling mechanism 66 does not transmit the reciprocating motion of the valve lifter 64 to the intake valve 32, keeping the intake valve 32 closed.

Figure 5:
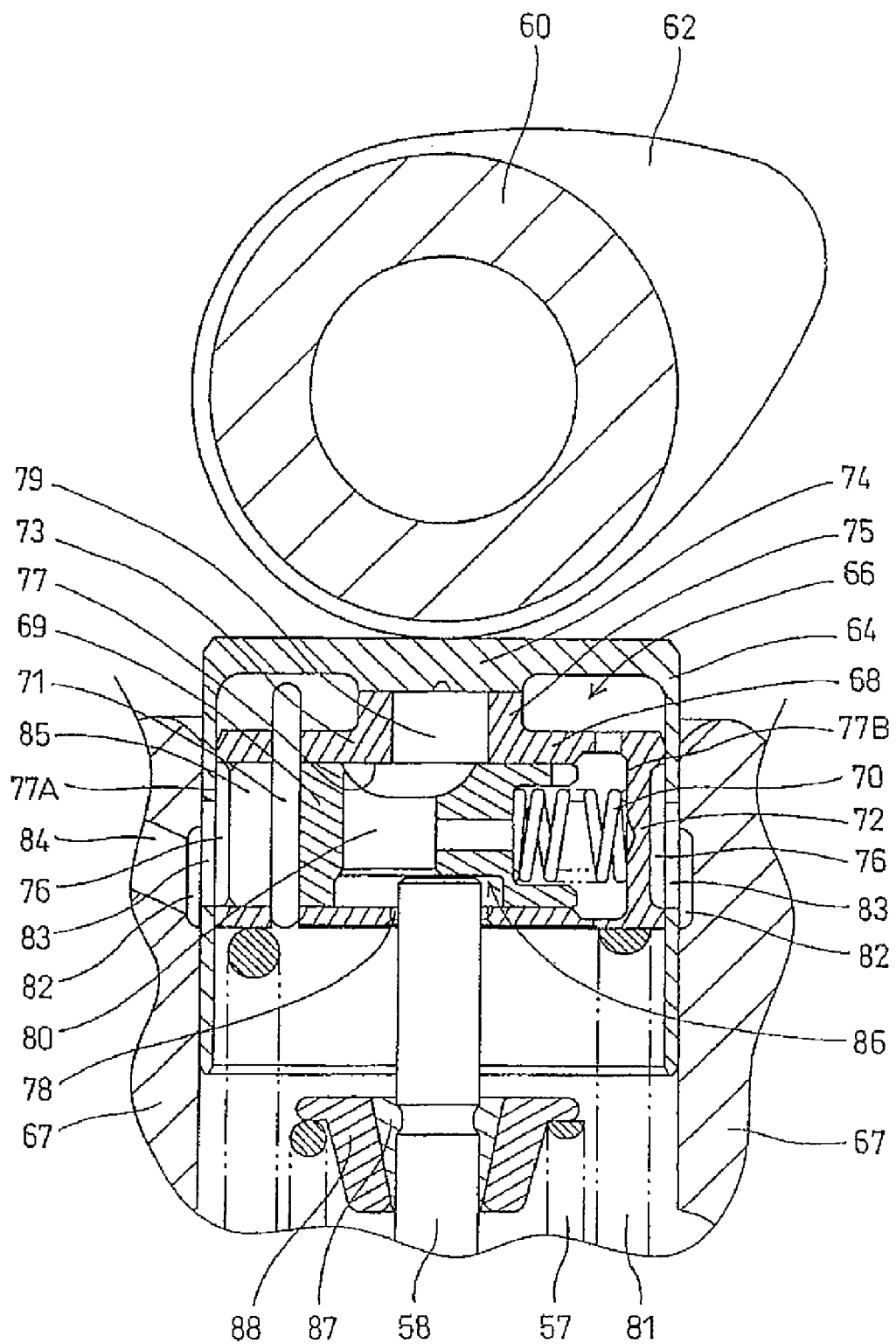
FIG. 5 is an enlarged view of a valve lifter of an intake valve and associated parts.

FIG. 5 is an enlarged view of the valve lifter 64 of the intake valve 32 and associated parts. The valve disabling mechanism 66 includes a hollow cylindrical holder 68 slidably fitted in the valve lifter 64 for sliding movement in the direction along the valve stem 58. A slide pin 69 is slidably fitted in the holder 68 for sliding movement in a direction perpendicular to the direction along the valve stem 58 with a helical spring 70 disposed between the holder 68 and the slide pin 69. A stopper pin 71 is mounted on the holder 68. The holder 68 is an integral component which includes a ring 72, a joint 73 diametrically joining the ring 72, and a presser 75 projecting upwardly centrally from the joint 73 and pressing a ceiling wall 74 of the valve lifter 64. The ring 72 has an inner annular oil passage 76 defined fully circumferentially in an outer circumferential surface thereof. The joint 73 has a cylindrical slide pin housing hole 77 defined therein which has an open end 77A and a closed end 77B. The joint 73 also has a lower through hole 78 defined in a lower portion thereof and receiving the tip end of the valve stem 58 inserted therein. The presser 75 has an upper through hole 79 defined therein coaxially with the lower through hole 78 for receiving the tip end of the valve stem 58 inserted therein. The slide pin housing hole 77 receives therein the slide pin 69 which is reciprocally movable in its axial directions. The slide pin 69 has a valve stem insertion hole 80 defined centrally therein which has an axis parallel to the valve stem 58. The valve spring 57 is surrounded by a support spring 81 for pushing the holder 68 upwardly to press the presser 75 into abutment against the ceiling wall 74 and urge the valve lifter 64 upwardly to hold the ceiling wall 74 in contact with the intake cam 62.

The lifter support 67 has an outer annular oil passage 82 defined in an inner circumferential surface thereof. The inner annular oil passage 76 and the outer annular oil passage 82 are held in communication with each other through lifter side through holes 83 defined in the side of the valve lifter 64. The outer annular oil passage 82 is supplied with hydraulic pressure from a hydraulic pressure supply passage 84 (also see FIG. 4). The hydraulic pressure acts in a hydraulic pressure chamber 85 on the end of the slide pin 69 through the lifter side through holes 83 and the inner annular oil passage 76. The hydraulic pressure can switch between a low hydraulic pressure level and a high hydraulic pressure level depending on how the valve disabling mechanism 66 should operate. When the high hydraulic pressure level acts in the hydraulic pressure chamber 85, the slide pin 69 is pushed to compress the helical spring 70.

FIG. 5 shows the position of the parts in which the low hydraulic pressure level acts in the hydraulic pressure chamber 85. When the helical spring 70 is extended, the slide pin 69 is forced to a stop in abutment against the stopper pin 71. The support spring 81 holds the presser 75 of the holder 68 in abutment against the ceiling wall 74 of the valve lifter 64, holding the valve lifter 64 in contact with the cam 60. The valve spring 57 causes a cotter 87 and a retainer 88 to press the valve stem 58, holding the tip end of the valve stem 58 in abutment against an abutting surface 86 on a lower portion of the slide pin 69. When the cam 62 is rotated, the valve lifter 64 vertically moves in unison with the valve stem 58, operating the intake valve 32 (FIG. 4). In this state, the intake valve 32 is operated, operating the cylinder 21*a* or 21*d*.

Figure 6:
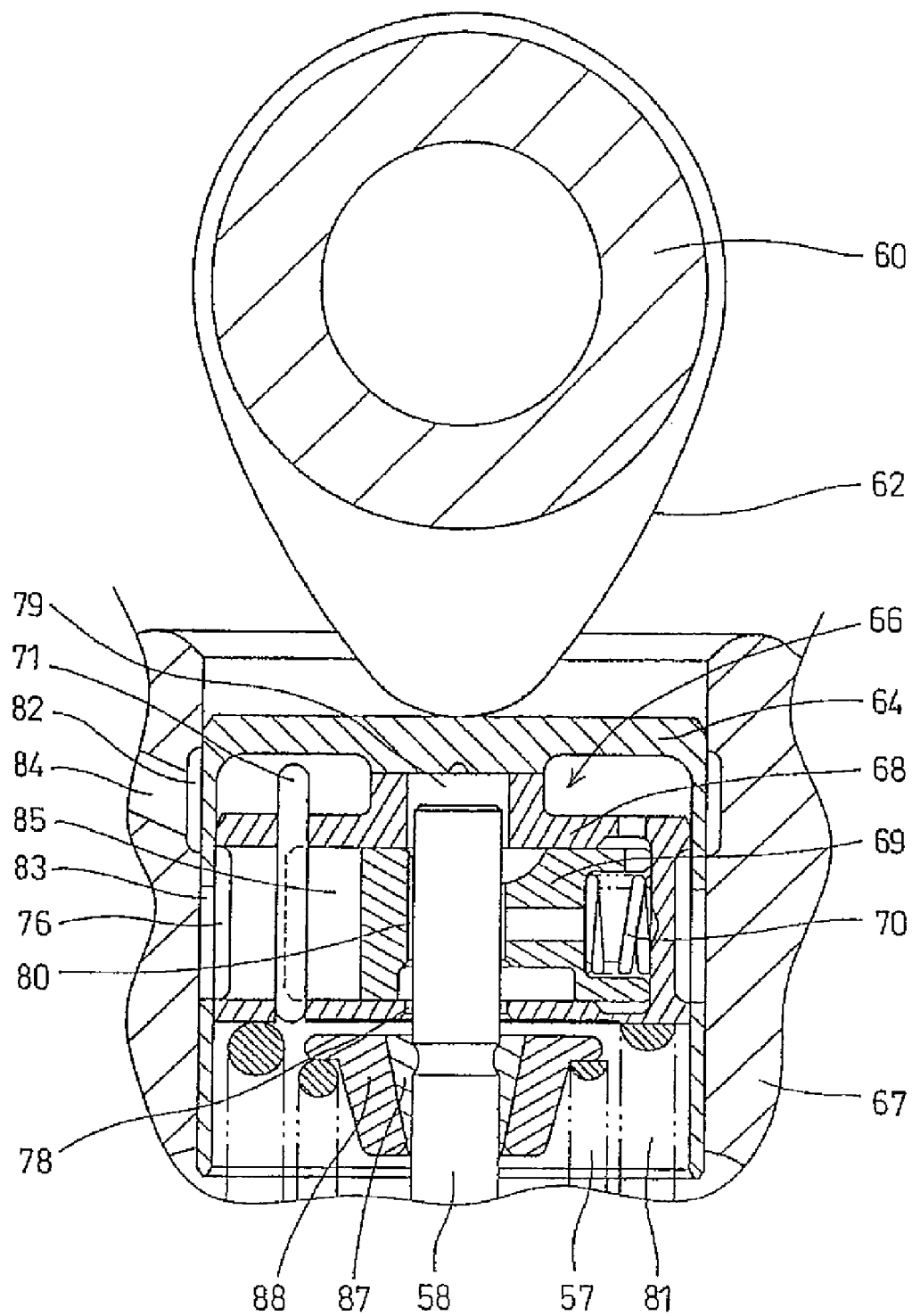
FIG. 6 is an enlarged view of the valve lifter and associated parts at the time the valve is disabled.

FIG. 6 is an enlarged view of the valve lifter 64 and associated parts at the time the intake valve 32 is disabled. FIG. 6 shows the position of the parts at the instant the high hydraulic pressure level acts in the hydraulic pressure chamber 85 and the cam 62 is rotated to lower the valve lifter 64. The slide pin 69 is pressed to the right in FIG. 6 against the spring force of the helical spring 70. Since the valve stem insertion hole 80 in the slide pin 69 and the valve stem 58 are axially aligned with each other, the valve stem 58 which is pressed upwardly by the valve spring 57 is insertable into the valve stem insertion hole 80 and the upper through hole 79. As the valve stem 58 is pressed upwardly, the intake valve 32 is closed. The support spring 81 presses the holder 68 upwardly together with the slide pin 69, bringing the valve lifter 64 into abutment against the cam 62. When the cam 62 is rotated, the valve lifter 64, the holder 68, and the slide pin 69 vertically move in unison with each other. Since the tip end of the valve stem 58 is in a free state within the lower through hole 78, the valve stem insertion hole 80, and the upper through hole 79, the intake valve 32 remains closed even though the valve lifter 64 moves. In this state, the intake valve 32 is disabled in the closed position, disabling the cylinder 21*a* or 21*d*.

Figure 7:
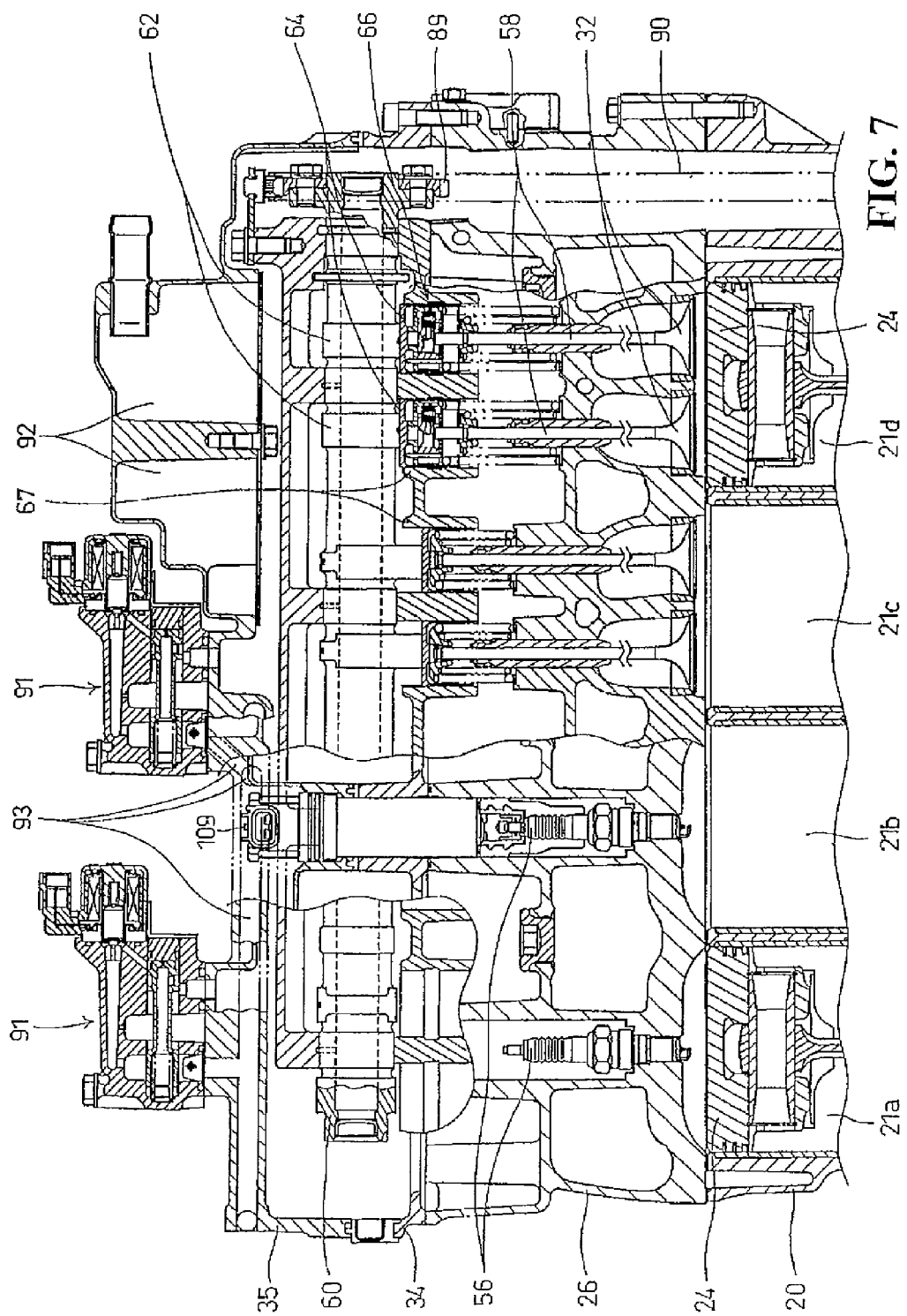
FIG. 7 is a longitudinal cross-sectional view of an upper portion of the engine.

FIG. 7 is a longitudinal cross-sectional view of an upper portion of the engine E. The cylinder block 20, the cylinder head 26, the cylinder head extension member 34, and the cylinder head cover 35 are arranged successively upwardly in the order named in FIG. 7. The four cylinders 21 are arrayed parallel in the lateral direction. The intake cam shaft 60 is supported between the cylinder head cover 35 and the cylinder head extension member 34. A cam shaft driven sprocket 89 is mounted on the right end of the intake cam shaft 60, which is driven by the crankshaft 23 through a cam shaft drive chain 90 trained around the cam shaft driven sprocket 89. Two intake valves 32 are provided in association with each cylinder 21, and the intake valve lifter 64 is disposed above each of the intake valves 32. The intake cams 62 on the intake cam shaft 60 are held against the upper ends of the intake valve lifters 64. The intake valve lifters 64 are slidably supported by the lifter supports 67. Though not shown, the exhaust cam shaft 61, the exhaust cams 63, the exhaust valves 33, the exhaust valve lifters 65, and the cam shaft driven sprocket 89 are also similarly provided.

Each cylinder 21 has a total of four valves, i.e., two intake valves 32 and two exhaust valves 33. The two cylinders 21*a*, 21*d* on the left and right ends of the cylinder array are cylinders with cylinder disabling mechanisms. More specifically, all the valve lifters of the four intake and exhaust valves of each of the cylinders 21*a*, 21*d* on the left and right ends of the cylinder array are associated with respective valve disabling mechanisms 66. The hydraulic pressure supply passages 84 (FIG. 4) which extend and are branched from hydraulic pressure control valves 91, to be described later, apply hydraulic pressure simultaneously to the four valve disabling mechanisms 66. When the hydraulic pressure applied simultaneously to the four valve disabling mechanisms 66 is of a high hydraulic pressure level, the four valve disabling mechanisms 66 are simultaneously operated to disable the valves, disabling the corresponding cylinder. The four valve disabling mechanisms 66 as they are combined together are referred to as the cylinder disabling mechanism. The two central cylinders of the cylinder array are not associated with valve disabling mechanisms.

Two hydraulic pressure control valves 91 of an identical type are disposed on an upper surface of the cylinder head cover 35. The hydraulic pressure control valves 91 serve to control the hydraulic pressures of the valve disabling mechanisms for the cylinder at the left end of the cylinder array and the cylinder at the right end of the cylinder array. As a breather chamber 92 is provided on the right end portion of the upper surface of the cylinder head cover 35, the right hydraulic pressure control valve 91 is positioned closely to the center of the engine E, but serves to control the hydraulic pressure of the valve disabling mechanism 66 for the cylinder 21 at the right end of the cylinder array. The working oil discharged from the two hydraulic pressure control valves 91 is branched at positions near the corresponding cylinders 21, and supplied simultaneously to the four valve disabling mechanisms 66.

Figure 8:
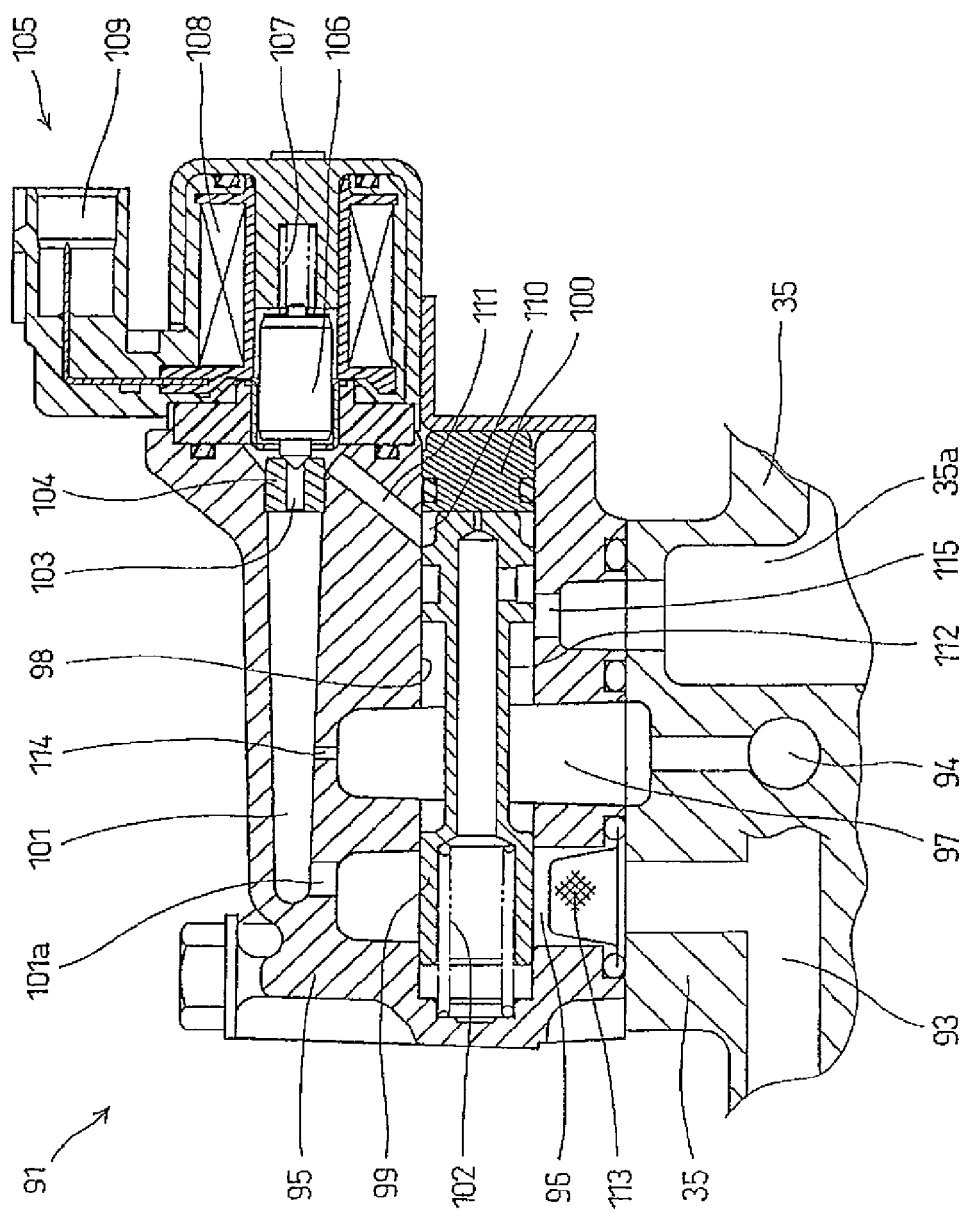
FIG. 8 is a cross-sectional view of a hydraulic pressure control valve.

FIG. 8 is a cross-sectional view of each of the hydraulic pressure control valves 91. The hydraulic pressure control valve 91 serves to control the level of the hydraulic pressure delivered to the valve disabling mechanism 66. The hydraulic pressure control valve 91 serves to selectively connect and disconnect a working oil supply passage 93 and a working oil discharge passage 94 which are defined in the upper surface of the cylinder head cover 35. The hydraulic pressure control valve 91 includes a housing 95 having an inlet port 96 communicating with the working oil supply passage 93 and an outlet port 97 communicating with the working oil discharge passage 94. The housing 95 also has a valve body housing hole 98 defined centrally therein and having a closed end and an open end. The valve body housing hole 98 houses a spool valve body 99 slidably fitted therein. The open end of the valve body housing hole 98 is closed by a cap 100. A first helical spring 102 for normally pushing the spool valve body 99 toward the cap 100 is housed in the valve body housing hole 98 near the close end thereof. The housing 95 has a communication passage 101 defined therein parallel to the valve body housing hole 98. The communication passage 101 has an end connected through a small hole 101a to the input port 96 and another end connected to a solenoid-operated on-off valve 105 through a valve seat 104 having a connecting hole 103. The solenoid-operated on-off valve 105 includes a valve body 106, a second helical spring 107, a solenoid coil 108, and a power supply connector 109. The second helical spring 107 normally pushes the valve body 106 in a direction to close the connecting hole 103.

A pilot oil chamber 110 is defined between the spool valve body 99 and the cap 100, and is connected to the connecting hole 103 by a pressurization passage 111 defined in the housing 95. The spool valve body 99 has a small-diameter central portion 112. An oil filter 113 is held in place between the working oil supply passage 93 and the inlet port 96. The housing 95 has an orifice 114 defined therein which provides fluid communication between the communication passage 101 and the outlet port 97. Even when the spool valve body 99 is in a closed position, the inlet port 96 and the outlet port 97 communicate with each other through the small hole 101a, the communication passage 101, and the orifice 114, so that a low hydraulic pressure restricted by the orifice 114 is supplied at all times to the working oil discharge passage 94. The housing 95 has an open port 115 defined in a lower portion thereof. When the spool valve body 99 is in a position to close the inlet port 96, the open port 115 communicates with the outlet port 97 through the space around the small-diameter central portion 112 of the spool valve body 99, allowing the hydraulic pressure in the working oil discharge passage 94 to be released into an inner space 35a in the cylinder head cover 35.

When the solenoid-operated on-off valve 105 of the hydraulic pressure control valves 91 is opened, the hydraulic pressure in the working oil supply passage 93 is supplied through the inlet port 96, the small hole 101a, the communication passage 101, the connecting hole 103, and the pressurization passage 111 to the pilot oil chamber 110, moving the spool valve body 99 in a direction to compress the first helical spring 102. The inlet port 96 and the outlet port 97 are now brought into fluid communication with each other through the space around the small-diameter central portion 112 of the spool valve body 99, and the outlet port 97 and the open port 115 are brought out of fluid communication with each other. Since the inlet port 96 and the outlet port 97 communicate with each other, the high hydraulic pressure level acts in the hydraulic pressure chamber 85 (FIG. 6) of the valve disabling mechanism 66 through the working oil discharge passage 94 and the hydraulic pressure supply passage 84 (FIG. 4), causing the valve disabling mechanism 66 to disable the intake valves 32 and the exhaust valves 33 in a closed state.

When the solenoid-operated on-off valve 105 of the hydraulic pressure control valves 91 is closed, the spool valve body 99 is pushed to its original position by the first helical spring 102, bringing the inlet port 96 and the outlet port 97 out of fluid communication with each other and also bringing the outlet port 97 and the open port 115 into fluid communication with each other. The hydraulic pressure in the hydraulic pressure chamber 85 of the valve disabling mechanism 66 is released, and the slide pin 69 of the valve disabling mechanism 66 moves to the position (FIG. 5) to open and close the valves. The intake valves 32 and the exhaust valves 33 are now normally opened and closed as the cams 62, 63 are rotated.

Figure 9:
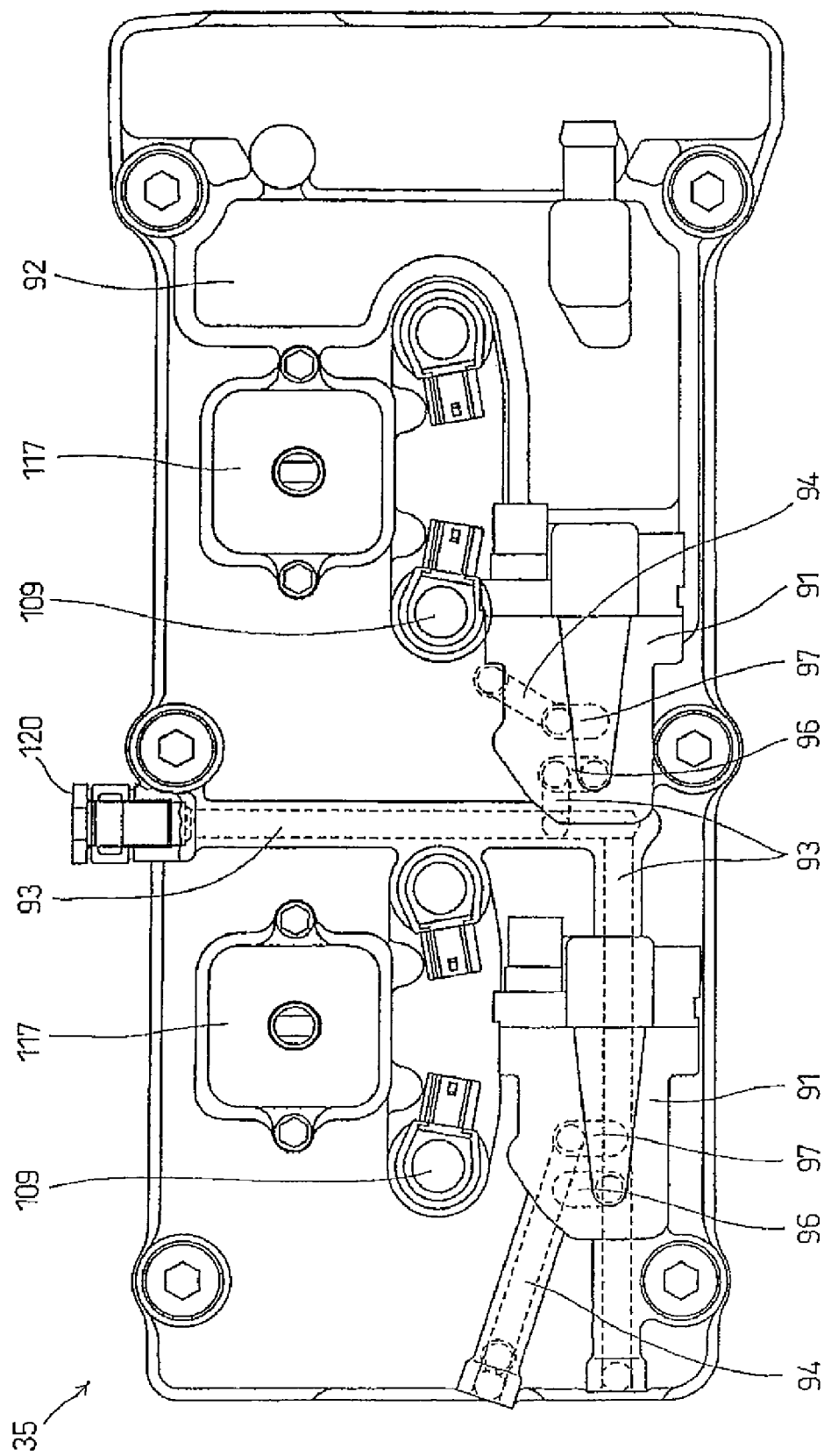
FIG. 9 is a plan view of a cylinder head cover.

FIG. 9 is a plan view of the cylinder head cover 35. On the upper surface of the cylinder head cover 35 are provided the breather chamber 92, two secondary air chambers 117 for delivering air to the exhaust ports 29, power supply connectors 109 for the four ignition plugs, and the two hydraulic pressure control valves 91. The working oil supply passage 93 extends rearwardly from a working oil supply passage connector 120 on a front surface of the upper portion of the cylinder head cover 35, extends to a region intermediate between the two hydraulic pressure control valves 91, and is branched to the inlet ports 96 of the respective hydraulic pressure control valves 91. The branched working oil supply passage 93 is also shown in FIG. 7. The power supply connectors 109 for the ignition pugs are also shown in FIG. 7. The working oil supply passage connector 120 is a member for interconnecting an externally mounted pipe oil passage 118, to be described later, and the working oil supply passage 93.

Figure 10:
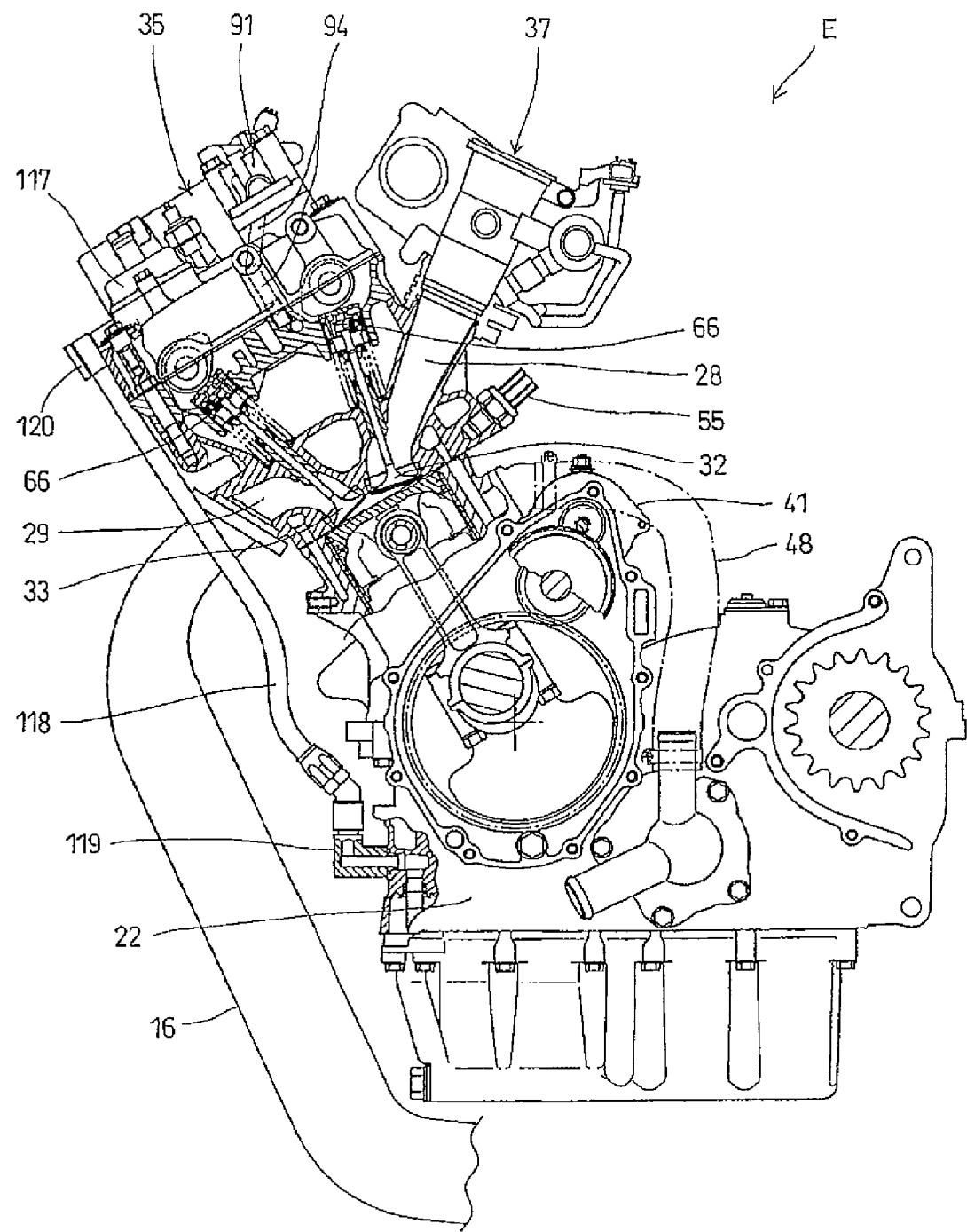
FIG. 10 is a vertical cross-sectional view of the engine including intake and exhaust valves.

The working oil discharge passages 94 for the working oil discharged from the hydraulic pressure control valves 91 extend from the respective outlet ports 97 of the hydraulic pressure control valves 91. The working oil discharge passages 94 are also shown in FIG. 10. The working oil discharge passages 94 are connected to the hydraulic pressure supply passage 84 shown in FIG. 4 for supplying the hydraulic pressure to the valve disabling mechanisms 66.

FIG. 10 is a vertical cross-sectional view of the engine E including the intake and exhaust valves. The externally mounted pipe oil passage 118 extends from a front surface of a lower portion of the crankcase 22 toward an upper portion of the cylinder head cover 35. The crankcase 22 houses therein two oil pumps (not shown) that are actuated by the main shaft of the transmission through chains. One of the oil pumps serves to deliver a lubricating oil, and the other to operate the cylinder disabling mechanism. The working oil discharged from the lubricating oil pump is supplied through the oil filter 51 (FIG. 3) to components to be lubricated of the engine E. The working oil discharged from the oil pump for the cylinder disabling mechanism flows through an oil filter, not shown, and is delivered from a working oil outlet connector 119 on the front surface of the lower portion of the crankcase 22 through the externally mounted pipe oil passage 118 to the front surface of the upper portion of the cylinder head cover 35. The externally mounted pipe oil passage 118 has an upper end connected to the working oil supply passage connector 120 (see also FIG. 9) on the front surface of the cylinder head cover 35. As shown in FIG. 9, the working oil supply passage 93 extends from the working oil supply passage connector 120 rearwardly on the upper surface of the cylinder head cover 35, extends to the region intermediate between the two hydraulic pressure control valves 91, is then branched and connected to the inlet ports 96 of the respective hydraulic pressure control valves 91 for supplying the working oil. The working oil discharge passages 94 that are connected to the outlet ports 97 of the hydraulic pressure control valves 91 extend downwardly, as shown in FIG. 10, and are connected to the hydraulic pressure supply passage 84 shown in FIG. 4 for supplying the hydraulic pressure to the valve disabling mechanisms 66.

The oil for disabling the cylinders flow from the front portion of the crankcase 22 to the hydraulic pressure chamber 85 of each valve disabling mechanism along the following route:

the working oil outlet connector 119 (FIG. 10),
the working oil supply passage connector 120 (FIGS. 9, 10),
the working oil supply passage 93 (FIGS. 8, 9),
the inlet port 96 of the hydraulic pressure control valve 91 (FIGS. 8, 9),
the hydraulic pressure control valve 91 (FIGS. 7, 8, 9),
the outlet port 97 of the hydraulic pressure control valve 91 (FIGS. 8, 9),
the working oil discharge passage 94 (FIGS. 8, 9, 10),
the hydraulic pressure supply passage 84 (FIGS. 4, 5, 6), and
the valve disabling mechanism 66 (FIGS. 4, 5, 6).

The embodiment of the present invention described in detail above offers the following advantages:

Since the oil passage extending to the hydraulic pressure control valve includes an externally mounted pipe, the oil passage can be installed more easily than if it is defined in the crankcase and the cylinder block as is the case with the background art. If the oil passage is disposed on a rear surface of the engine, the pipe is complex and long because of functional components including the intake system 37, the starter motor 41, the knock sensor 55, the coolant hose 48, etc. The oil passage disposed on the front surface of the engine allows the pipe to be easily installed and short.

Since the working oil supply passage disposed on the upper portion of the cylinder head cover extends to a region intermediate between adjacent hydraulic pressure control valves and is then branched and connected to the inlet ports of the hydraulic pressure control valves, the working oil supply passage disposed on the upper portion of the cylinder head cover can be shortened.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An engine with a cylinder disabling mechanism comprising:
    a crankcase of a motorcycle engine;
    a cylinder block mounted on an upper portion of the crankcase and including a plurality of cylinders with pistons disposed respectively therein;
    a cylinder head mounted to an upper portion of the cylinder block;
    a cylinder head cover mounted to an upper portion of the cylinder head;
    combustion chambers defined between a lower surface of the cylinder head and upper surfaces of the pistons;
    engine valves disposed in the cylinder head on intake and exhaust sides of the combustion chambers;
    a valve operating device disposed between the cylinder head and the cylinder head cover, for opening and closing the engine valves;
    an engine valve disabling mechanism for disabling opening and closing movement of the engine valves in response to hydraulic pressure;
    an oil pump disposed in a lower portion of the crankcase, for supplying the hydraulic pressure to the engine valve disabling mechanism; and
    a hydraulic pressure control valve for controlling the supply of hydraulic pressure to the engine valve disabling mechanism depending on a vehicle operating state;
    wherein a pipe for delivering working oil from the lower portion of the crankcase to the hydraulic pressure control valve is disposed on a front surface of the engine.

2. The engine with the cylinder disabling mechanism according to claim 1, wherein the cylinder disabling mechanism is associated with the cylinders, said hydraulic pressure control valve comprises a plurality of hydraulic pressure control valves corresponding to the cylinders associated with the cylinder disabling mechanism, the pipe disposed on the front surface of the engine includes an upper portion connected to a working oil supply passage defined in an upper portion of the cylinder head cover, and the working oil supply passage extends to a region intermediate between adjacent ones of the hydraulic pressure control valves and is branched and connected to inlet ports of the respective hydraulic pressure control valves.

3. The engine with the cylinder disabling mechanism according to claim 1, wherein the engine valve disabling mechanism includes a holder with a slide pin operatively positioned within said holder for enabling the opening and closing of the engine valves and for selectively disenabling the opening and closing of the engine valves in response to the hydraulic pressure applied thereto.

4. The engine with the cylinder disabling mechanism according to claim 3, and further including a biasing member operatively positioned between the slide pin and the holder for normally biasing the slide pin to a position for enabling the opening and closing of the engine valves.

5. The engine with the cylinder disabling mechanism according to claim 4, and further including a lifter side hole for enabling hydraulic pressure to be in communication with said slide pin for selectively actuating the slide pin against the operation of the biasing member for moving said slide pin into a position for disenabling the opening and closing of the engine valves.

6. The engine with the cylinder disabling mechanism according to claim 4, and further including a stop pin for limiting the lateral movement of the slide pin by the biasing member.

7. The engine with the cylinder disabling mechanism according to claim 3, wherein the holder includes a joint with a presser projecting therefrom, said presser being in engagement with a ceiling wall of a valve lifter operatively associated with the engine valves.

8. The engine with the cylinder disabling mechanism according to claim 1, wherein the hydraulic pressure control valve includes a solenoid-operated on-off valve operatively connected to valve seat wherein actuation of the solenoid-operated on-off valve selectively opens or closes a passageway for selectively actuating the engine valve disabling mechanism.

9. The engine with the cylinder disabling mechanism according to claim 8, and further including a spool valve body operatively positioned within a pilot chamber, said spool valve body being normally biased to a closed position, said pilot chamber being selectively brought into communication with the hydraulic pressure supplied by the solenoid-operated on-off valve for selectively actuating the engine valve disabling mechanism.

10. The engine with the cylinder disabling mechanism according to claim 1, wherein when the engine operates at a low speed or under a low load, the valve disabling mechanism maintains an intake valve in a closed position.

11. A cylinder disabling mechanism adapted to be used with an engine comprising:
engine valves disposed in a cylinder head on intake and exhaust sides of combustion chambers;
a valve operating device for opening and closing the engine valves;
an engine valve disabling mechanism for disabling opening and closing movement of the engine valves in response to hydraulic pressure;
an oil pump for supplying the hydraulic pressure to the engine valve disabling mechanism;
a hydraulic pressure control valve for controlling the supply of hydraulic pressure to the engine valve disabling mechanism depending on a vehicle operating state; and
a pipe for delivering working oil to the hydraulic pressure control valve, said pipe being disposed on a front surface of the engine.

12. The cylinder disabling mechanism according to claim 11, wherein said hydraulic pressure control valve comprises a plurality of hydraulic pressure control valves corresponding to cylinders associated with the engine valve disabling mechanism, the pipe disposed on the front surface of the engine includes an upper portion connected to a working oil supply passage defined in an upper portion of a cylinder head cover, and the working oil supply passage extends to a region intermediate between adjacent ones of the hydraulic pressure control valves and is branched and connected to inlet ports of the respective hydraulic pressure control valves.

13. The cylinder disabling mechanism according to claim 11, wherein the engine valve disabling mechanism includes a holder with a slide pin operatively positioned within said holder for enabling the opening and closing of the engine valves and for selectively disenabling the opening and closing of the engine valves in response to the hydraulic pressure applied thereto.

14. The cylinder disabling mechanism according to claim 13, and further including a biasing member operatively positioned between the slide pin and the holder for normally biasing the slide pin to a position for enabling the opening and closing of the engine valves.

15. The cylinder disabling mechanism according to claim 14, and further including a lifter side hole for enabling hydraulic pressure to be in communication with said slide pin for selectively actuating the slide pin against the operation of the biasing member for moving said slide pin into a position for disenabling the opening and closing of the engine valves.

16. The cylinder disabling mechanism according to claim 14, and further including a stop pin for limiting the lateral movement of the slide pin by the biasing member.

17. The cylinder disabling mechanism according to claim 13, wherein the holder includes a joint with a presser projecting therefrom, said presser being in engagement with a ceiling wall of a valve lifter operatively associated with the engine valves.

18. The cylinder disabling mechanism according to claim 11, wherein the hydraulic pressure control valve includes a solenoid-operated on-off valve operatively connected to valve seat wherein actuation of the solenoid-operated on-off valve selectively opens or closes a passageway for selectively actuating the engine valve disabling mechanism.

19. The cylinder disabling mechanism according to claim 18, and further including a spool valve body operatively positioned within a pilot chamber, said spool valve body being normally biased to a closed position, said pilot chamber being selectively brought into communication with the hydraulic pressure supplied by the solenoid-operated on-off valve for selectively actuating the engine valve disabling mechanism.

20. The cylinder disabling mechanism according to claim 11, wherein when the engine operates at a low speed or under a low load, the valve disabling mechanism maintains an intake valve in a closed position.

* * * * *